(12) United States Patent
Curtis

(10) Patent No.: X9297
(45) Date of Patent: Dec. 28, 1835

(54) GOLD, AMALGAM MILL FOR SPARATING FROM ORE

(76) Inventor: Joseph Curtis

Joseph Curtis

The schedule referred to in these letters Patent and making part of the same containing a description in the words of the said Joseph Curtis himself of his Improvement in the Amalgam Mill for separating Gold from the Ore.

To all to whom these presents shall come

Be it known that I Joseph Curtis have invented certain new and useful improvements in an Amalgam Mill to take Gold from the Ore, and that the following is a full and exact description of the construction of said Machine as invented by me —

A pot or bed piece cast iron 1/2 an inch thick the pot part a a. 10 inches diameter and about 12 inches deep to the centre where a hole 1/2 inches diameter is cut and has a bent pipe or gooseneck No 1. screwed into which is fitted with a tapering female screw to receive the male screw on the end of the pipe 2. which is of sufficient length to pass through the brickwork of the furnace and this has a taper thumb screw 4. fitted in the end by the means of which the Mercury can be drawn out of the pot without disturbing the fire in the furnace 3. which is intended to be built under the Mill for the purpose of heating the mercury and thereby causing the amalgamation to be more perfect and also by building the furnace so as to throw the body of the flame on the pipe 2. and heat it to such a degree as to evaporate the mercury in the pipe and cause the Gold which has amalgamated to deposit there and as the Mercury after having evaporated in the pipe will condense in its passage upwards a fresh supply of mercury will be continually running into the pipe to take the place of that evaporated from the edge of the pot a.a. is a plain or flange c.c. 24 Inches diameter then a descending flange d.d. 2 inch deep to this flange is rivetted a cylinder of sheet iron e. e. 1/8 of an inch thick and 14 Inches deep at the top and outer side is rivetted a wrought iron hoop 1 Inch broad and 3/8 of an inch thick from this cylinder a place of discharge or spout f. of sheet iron 3 Inches square the upper part of which is within 2 inches of the top, this spout may be contracted by means of blocks of wood as the quantity of Ore may require).

A frame of timber say 3 inches square for the upright and 2½ inches by 6 inches for the cross piece is required to support the tube g on which the pulley h. is attached for a band, this frame of timber is secured to the mill by bolts and nutts passing through the descending flange d, and the timber, and also by 2 bolts and nutts passing through the wrought iron hoop at e. at the upper end of the cylinder, and timber.

Orifices of about 1/16 of an inch are made in the wrought iron cup and end of the tube below the lower revolving plate equalling or nearly so the sectional area of the tube to secure the bar l. in its place a wrought iron hoop not rivetted M. is put inside the pot the same being 1/16 of an inch thick and 2 inches deep on this rests the plate n. of 10 Inches diameter and 1/8 of an inch thick having a round hole in the centre of 5 inches diameter this is secured to its place by another hoop similar to M. (and in like manner as many hoops as may be required and the whole is secured by the upper plate p. which is screwed into its place by small screws going into the pot.)

To the cast iron tube one inch from the bottom resting on a small projection in the casting is a thin wrought iron hoop shrunk to the tube is a sheet iron
plate V. 1/8 of an inch thick and 9 inches diameter then
a sheet-iron hoop or sleve 1/8 inch thick and 2 inches
broad then another plate similar to V. all of which and
more if required are bedded on by keys or wedges.

G is a floating revolver made of fine plank 2
inches thick and 22 inches diameter the bottom of which
is covered with sheet copper to keep this true and per-
-fectly level it is attached to a wood tube T. 1/2 inch
thick and 14 inches long that fits the tube just not so
tight as to prevent its rising and falling as the fluid
may require in the upper end of the tube is inserted
an iron box W. (a cast wheel box does as well) a
groove is chipped 1/4 of an inch square lengthwise of the
box W. and a wrought iron feather or key of about 4
inches long is fitted to the groove and secured to the
cast iron tube.

To the outer edge of this wooden revolver
is attached a sheet iron cylinder. U. 1/8 inch thick and
12 inches deep to stiffen the cylinder a wrought iron
hoop 3/16 or 3/8 inches ~~thick~~ and 1 inch broad is riveted
inside the upper edge. The pulley W. for the band
is permanently fitted with a cast iron box W. inside
and projecting above the pulley say one inch which runs
in the brasses X. fitted in the cross beams the cast iron
box can be adjusted so as to keep the tube in its place
which when the quicksilver is in the pot as pressing
upwards. To the cast iron tube a pipe of tin,
Iron, or copper Y. with a funnel top is inserted of
sufficient length to be equal to the hydrostatic power
required which for the machine here named must be
60 inches.

The quicksilver must fill the pot and say 1 inch deep on the plain or flange of 24 inches. The recei-ver which floats must have a weight of sand or water to cause it to settle say 1/2 an inch into the quicksilver The Ore must be reduced to an impalpable powder either by dry or wet process when prepared for this Mill it must be wet and conducted in a running stream of water into the tunnel of the upper tube whence it will find its way by its pressure through the orifices in the lower end of the tube and through the quick=silver to the discharge spout f. in the direction of the arrows.

The intent of giving the centre part a circu-lar motion is to cause a more thorough distribution of the ore and water among the mercury. The quality of the Ore to the measure of water depends on the earthy State of the ore The revolutions of the mill may be suppose[d] to average 16 a minute, but all depends on the quality of the Ore And I Joseph Curtis do hereby claim as my invention and improvement in the amalgum Mill the application of heat to the ore in passing through the stratum of quicksilver by making the fire glide around or beneath the vessel in which the process is carried forward in manner aforesaid or in any other manner prefered Witnesses Joseph R. Curtis L. Gaylord Clark Joseph Curtis Drawing

United States Patent
Patent No.: X9297
3 Sheets—Sheet 1.
J. CURTIS.
MILL FOR SEPARATING GOLD FROM ORE.
Patented Dec. 28, 1835.
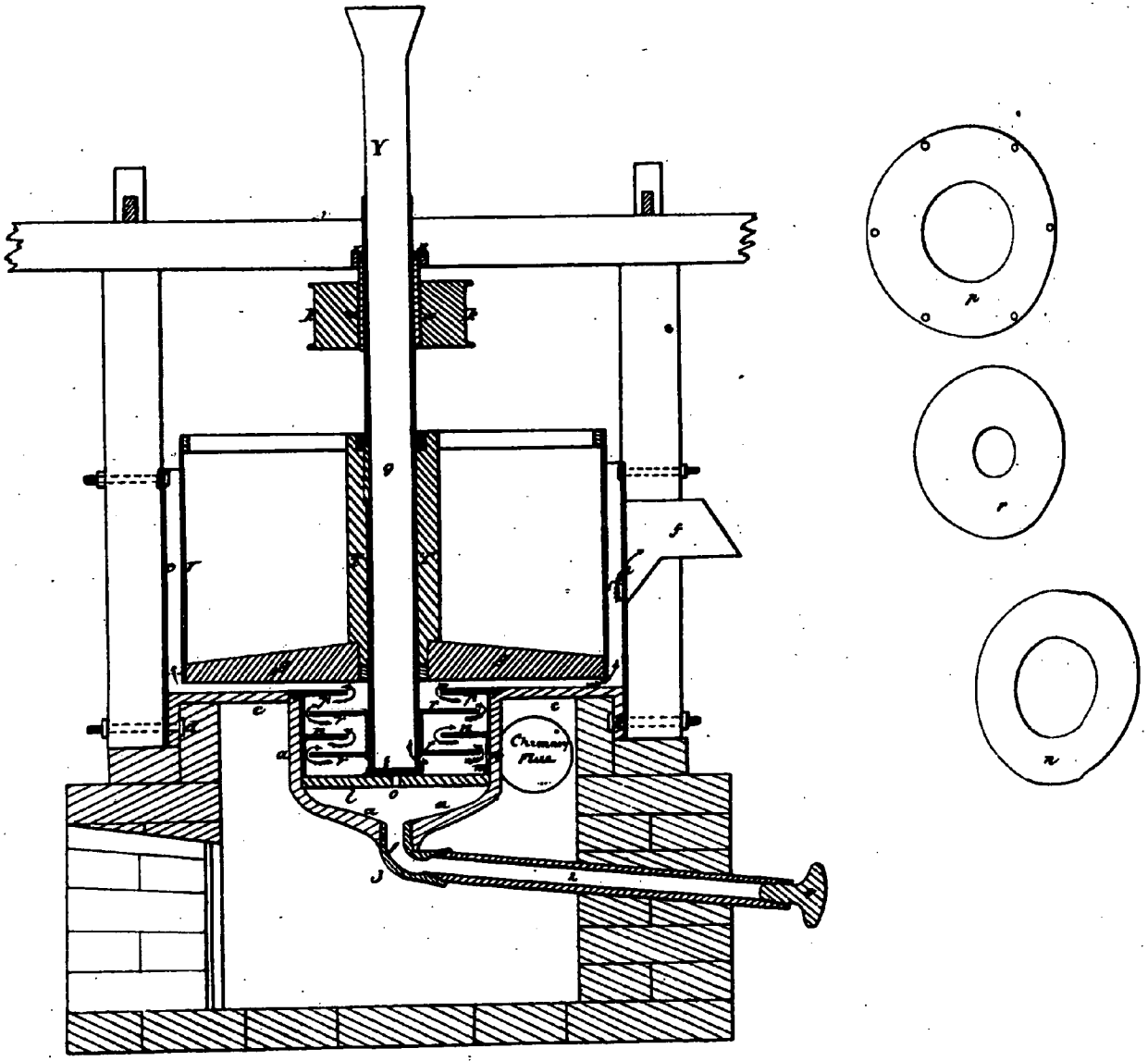

United States Patent
Patent No.: X9297
3 Sheets—Sheet 2.
J. CURTIS.
MILL FOR SEPARATING GOLD FROM ORE.
Patented Dec. 28, 1835.
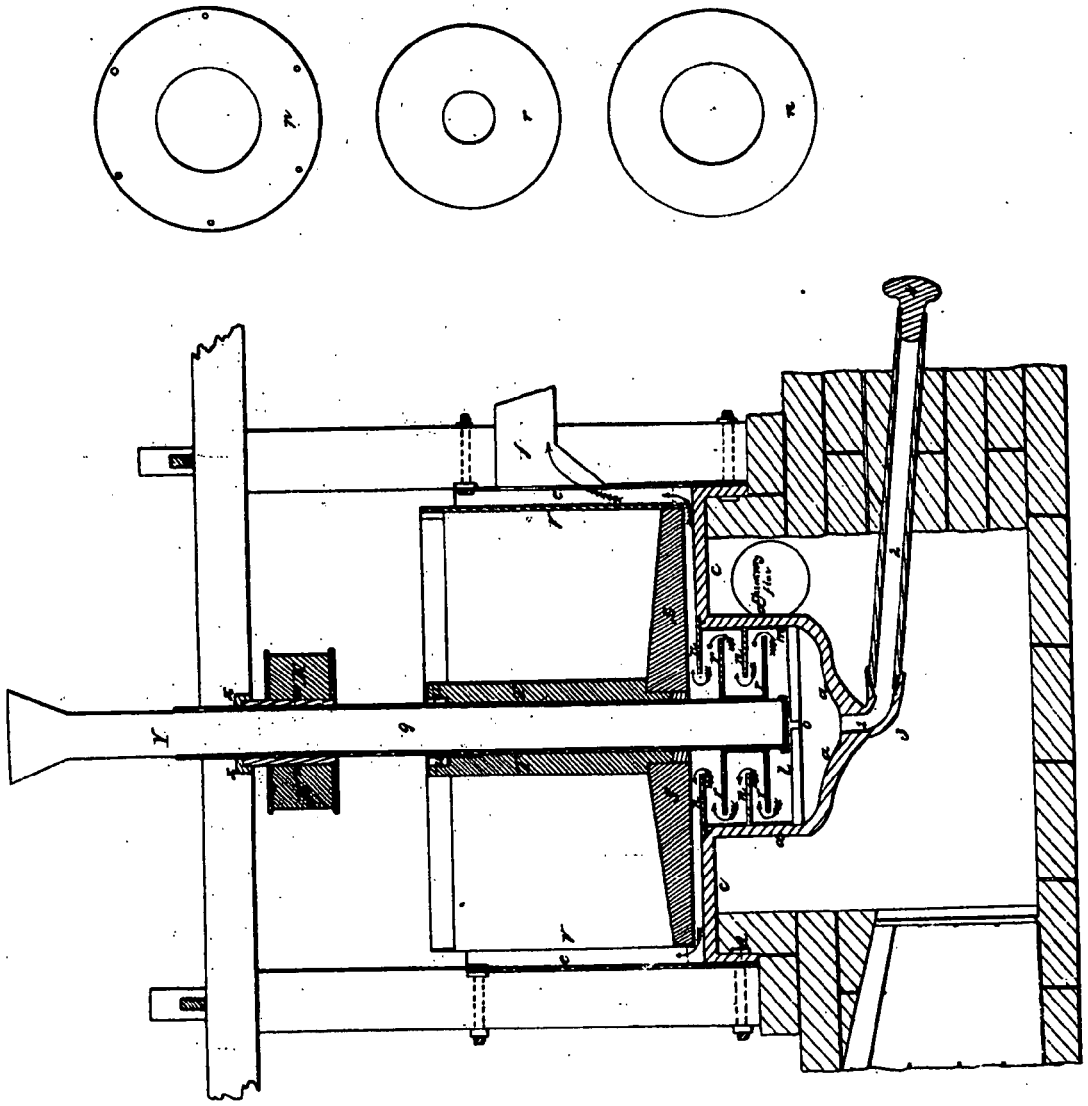

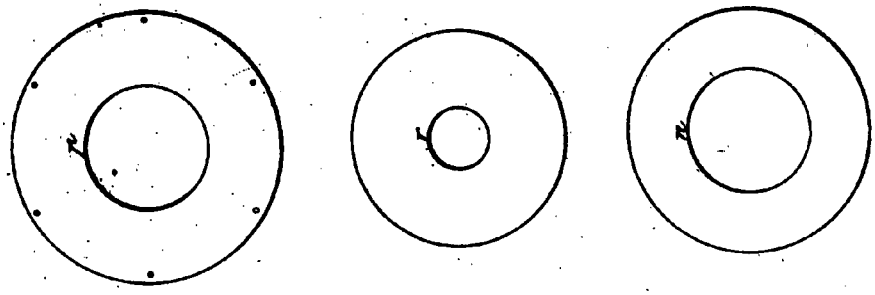
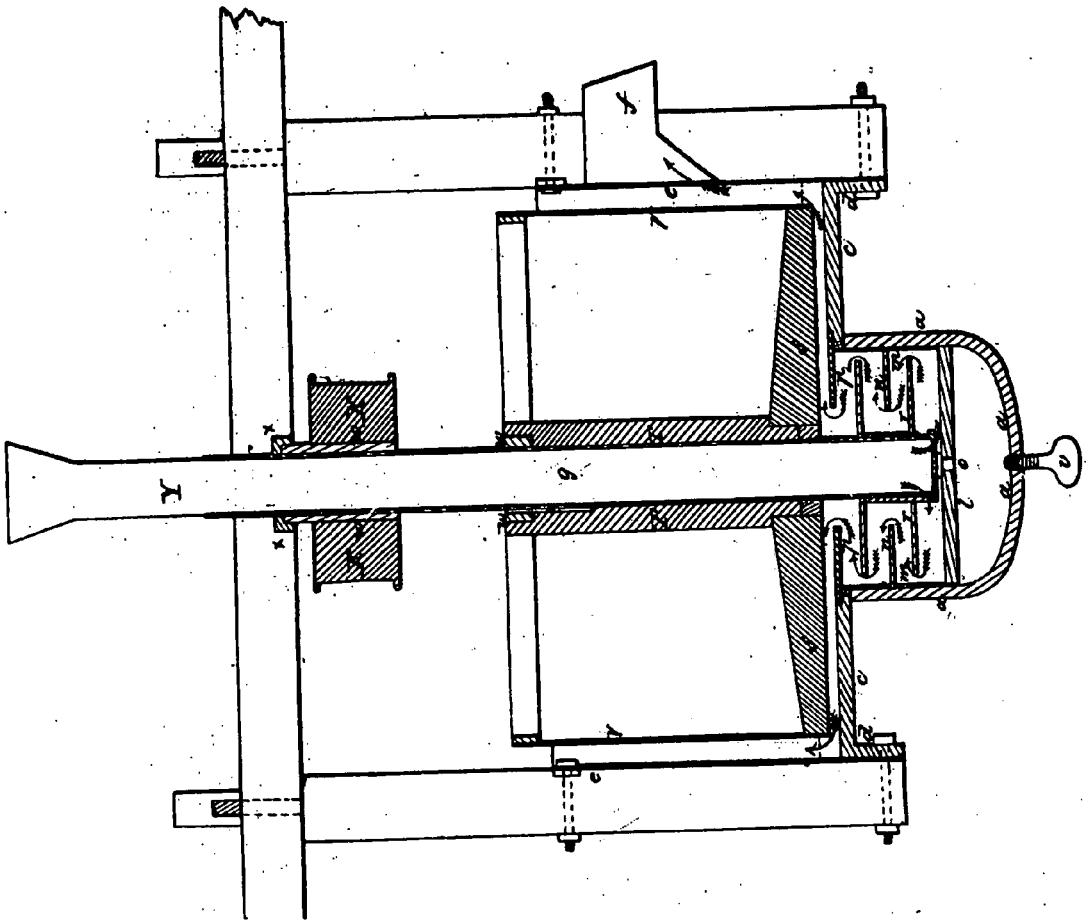

United States Patent
Patent No.: X9297
3 Sheets—Sheet 3.
J. CURTIS.
MILL FOR SEPARATING GOLD FROM ORE.
Patented Dec. 28, 1835.